United States Patent
Raskin et al.

(10) Patent No.: US 9,055,533 B2
(45) Date of Patent: Jun. 9, 2015

(54) WIRELESS COMMUNICATION DEVICE AND METHOD FOR IMPROVED WIFI AND BLUETOOTH COEXISTENCE USING REDUCED POWER FOR CONTROL PACKETS

(75) Inventors: Rafi Raskin, Haifa (IL); Eitan Preiszler, Menashe (IL); Ofer Markovits, Haifa (IL); Shani Ben-Haim, Haifa (IL); Ran Mor, Petach-Tikva (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/328,051

(22) Filed: Dec. 16, 2011

(65) Prior Publication Data
US 2013/0156012 A1    Jun. 20, 2013

(51) Int. Cl.
*H04W 52/14* (2009.01)
*H04W 52/32* (2009.01)
*H04W 52/48* (2009.01)
*H04W 88/06* (2009.01)
*H04W 52/24* (2009.01)

(52) U.S. Cl.
CPC ............ *H04W 52/146* (2013.01); *H04W 88/06* (2013.01); *H04W 52/245* (2013.01); *H04W 52/247* (2013.01); *H04W 52/325* (2013.01); *H04W 52/48* (2013.01); *Y02B 60/50* (2013.01)

(58) Field of Classification Search
USPC .......... 370/278, 282, 311, 318, 319, 328, 338
See application file for complete search history.

(56) References Cited

U.S. PATENT DOCUMENTS

| | | | | |
|---|---|---|---|---|
| 5,811,890 A * | 9/1998 | Hamamoto | ..................... | 307/66 |
| 7,002,944 B2 * | 2/2006 | Kats et al. | ..................... | 370/338 |
| 7,346,034 B2 * | 3/2008 | Takano et al. | ................. | 370/331 |
| 7,831,271 B2 * | 11/2010 | Baker et al. | ................... | 455/522 |
| 7,860,018 B2 * | 12/2010 | Raith | ............................ | 370/252 |
| 2007/0149150 A1* | 6/2007 | Miyazaki | .................. | 455/127.1 |
| 2010/0309833 A1* | 12/2010 | Liu et al. | ....................... | 370/311 |
| 2011/0002278 A1* | 1/2011 | Lindoff et al. | ................ | 370/329 |
| 2011/0085485 A1* | 4/2011 | Yoon et al. | .................... | 370/311 |
| 2012/0120857 A1 | 5/2012 | Sudak et al. | | |
| 2012/0207101 A1* | 8/2012 | Chang et al. | .................. | 370/329 |
| 2012/0257519 A1* | 10/2012 | Frank et al. | .................... | 370/252 |
| 2013/0021915 A1* | 1/2013 | Catovic et al. | ............... | 370/241 |

* cited by examiner

*Primary Examiner* — Hong Cho
(74) *Attorney, Agent, or Firm* — Schwegman Lundberg & Woessner, P.A.

(57) ABSTRACT

Disclosed in some examples is a method including receiving a downlink data packet over a first wireless link using a first wireless protocol during communications over a second wireless link using a second wireless protocol the first and second wireless protocols being different; and sending a control packet in response to the downlink data packet over the first wireless link using a reduced power setting during the communications over the second wireless link, the reduced power setting being less than a non-control packet power setting.

18 Claims, 5 Drawing Sheets

WIRELESS COMMUNICATION DEVICE AND METHOD FOR IMPROVED WIFI AND BLUETOOTH COEXISTENCE USING REDUCED POWER FOR CONTROL PACKETS

BACKGROUND

Numerous wireless technologies utilize the Industrial Scientific and Medical frequency spectrum available for unlicensed use. Often, these wireless technologies utilize overlapping frequencies within ISM spectrum which creates the potential for interference.

BRIEF DESCRIPTION OF THE DRAWINGS

In the drawings, which are not necessarily drawn to scale, like numerals may describe similar components in different views Like numerals having different letter suffixes may represent different instances of similar components. The drawings illustrate generally, by way of example, but not by way of limitation, various embodiments discussed in the present document.

DETAILED DESCRIPTION

Multiple protocol wireless devices include multiple transceivers (or "cores") that implement different wireless protocols operating in overlapping frequency bands which may be susceptible to interference from one another. One method of preventing such interference utilizes a time division scheme whereby each core receives a designated time with which to communicate over its communication protocol. The designated time in many cases is based on a schedule that may be static, or may be dynamically determined by a TDM scheduling component. This solution is still less than ideal as the various wireless devices which communicate with the multiple protocol wireless device may send data during periods where the core with which it is communicating is not scheduled for communication. While the data may be received by the non-scheduled core, many communication protocols require an acknowledgement packet or other control packets to be sent in response to inform the sender that the recipient successfully received the packet. These control packets (e.g. acknowledgement packets) may not be sent without interfering with the scheduled core's communications. In various communication protocols, this can be problematic as the sending entity may assume that the receiving entity did not receive the packet and will likely resend the packet at a lower data rate. After the sending entity fails again to receive an acknowledgement, it will likely resend the packet at an even lower data rate. This downward rate spiral may continue until the sender is acknowledged or gives up. At that point, however, the data rate may be lowered unacceptably and may take a long time to recover.

Figure 1:
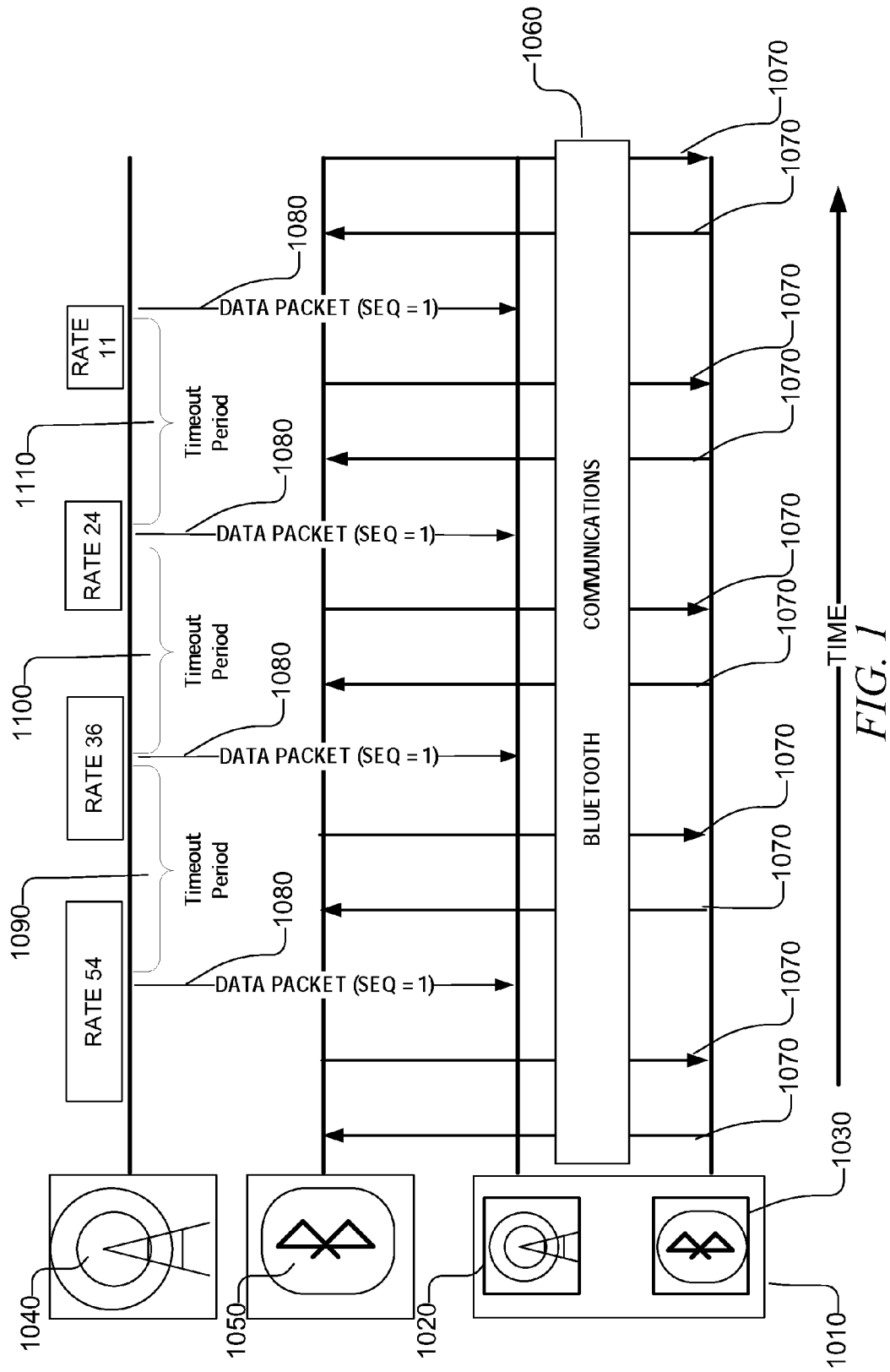
FIG. 1 shows a message sequence chart of a rate spiral according to some examples of the present disclosure.

A message sequence chart detailing this problem is shown in FIG. 1, where a multi protocol wireless device 1010 is shown which utilizes two different communication modules (i.e. cores) 1020 and 1030 operating two different communication protocols. Core 1020 may operate an orthogonal frequency division multiplexing communication protocol such as a communication protocol in accordance with an IEEE 802.11 family of standards, for example, IEEE 802.11-2007. Core 1030 may operate a frequency hopping spread spectrum communication protocol in accordance with a BLUETOOTH® family of standards (managed by the Bluetooth Special Interest Group), for example, Bluetooth Core version 2.0+EDR. Device 1010 is associated or in wireless communication with wireless access point or wireless station 1040 and also BLUETOOTH® device 1050.

BLUETOOTH® communications 1060 may consist of uplink and downlink packets, acknowledgements 1070, and periods of inactivity. While BLUETOOTH® communications 1060 are ongoing; the access point 1040 sends to device 1010 a downlink packet 1080 with a first sequence number (e.g., 1) at a first rate. Because device 1010 cannot interrupt the BLUETOOTH® communications 1060 (as it may be sensitive to interruptions—e.g. a voice conversation), device 1010 fails to send an acknowledgement packet to access point 1040. After a timeout period 1090 expires, the access point 1040 resends the same packet 1080 with a lower rate. After a subsequent time out period 1100, the access point again resends the same packet 1080 with an even lower data rate. After yet another subsequent timeout period 1110, the access point 1040 resends the packet 1080 again at an even lower data rate.

Other than a TDM solution to the interference problem, another solution may be to utilize a lower power for packets on one of the wireless links. In some protocols (e.g. 802.11 protocols), it is common practice for packets to be sent on the communication link at full power for better range and signal quality. Lowering the power level may decrease interference, but may introduce problems, as the node transmitting at a lower power may become "hidden" to nodes that are far away. This is because the lower the power of the transmission, the shorter the range of that transmission. This causes problems for communication protocols which depend on a node sensing that the channel is clear prior to initiating communications (e.g., Carrier Sense Multiple Access "CSMA" of the 802.11 protocol). Because the far-away node cannot detect the transmission of the low power node, the far-away node may begin transmitting even though the low power node may be currently transmitting, which leads to interference at other nodes which can detect both transmissions.

Disclosed in some examples are systems, methods, and machine-readable mediums which may be utilized by a device which communicates using multiple communication protocols to minimize interference between the protocols. This may be accomplished by utilizing a time division approach between the protocols and transmitting any control packets (e.g. acknowledgements) which are necessary to respond to a received downlink packet at a reduced power to avoid interrupting any communications of the other protocols. The transmission power of data packets sent by the cores may be unchanged (e.g., sent at full power). This allows an acknowledgement to be sent which prevents rate scaling while minimizing interference to any active communications taking place with the other protocols. This solution does not increase the prevalence of hidden nodes because the control frames (e.g. acknowledgement packets) are not generally utilized to sense the medium by the medium access and control layers of communication protocols, and because the data packets, which may be used in such a capacity, are sent at full power (and thus have greater range).

Figure 2:
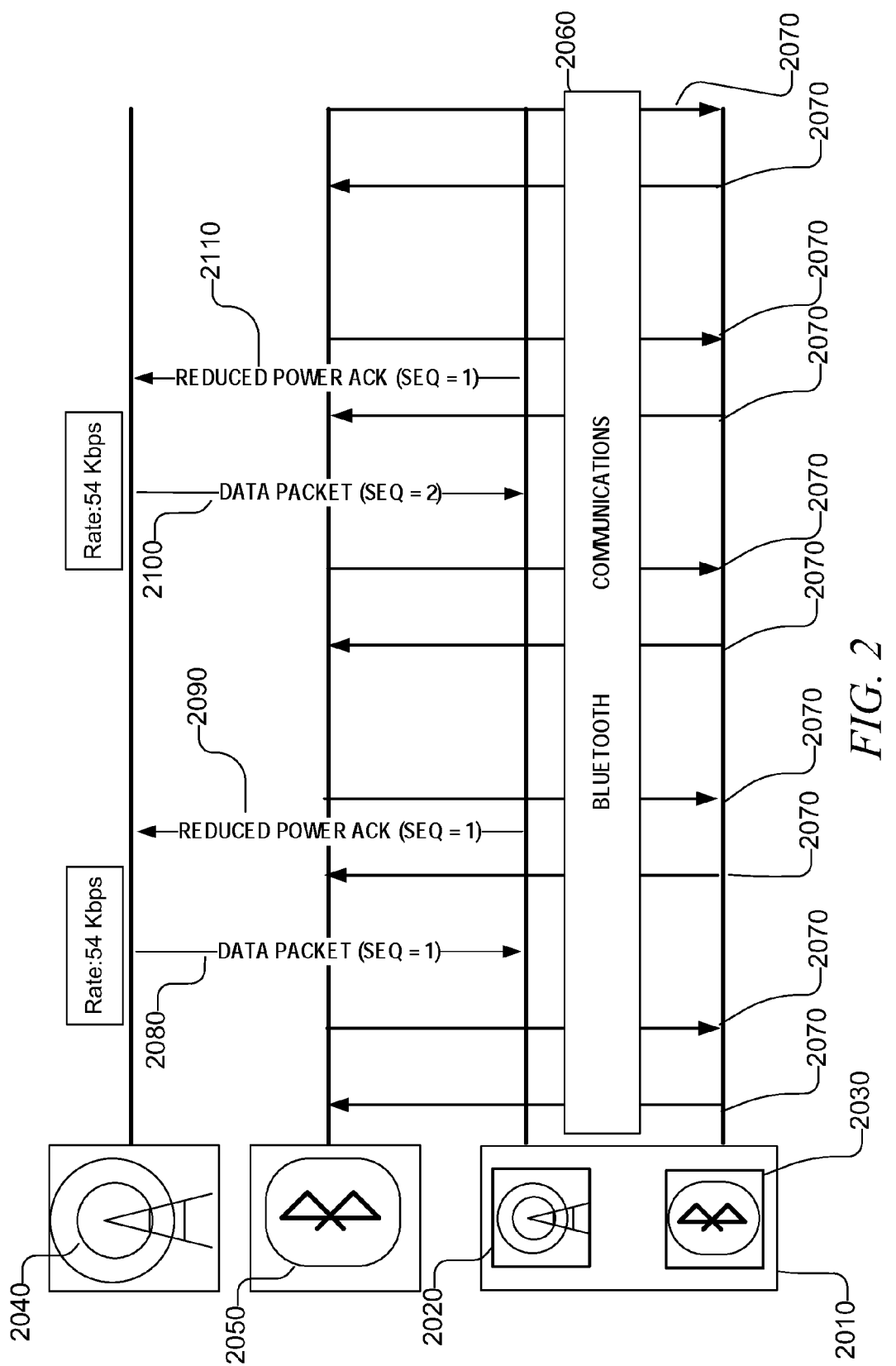
FIG. 2 shows a message sequence chart of a reduced power control packet according to some examples of the present disclosure.

A message sequence chart showing one example method is shown in FIG. 2, where a multi protocol wireless device 2010 is shown which utilizes two communication modules (i.e. cores) 2020 and 2030 operating two different communication protocols. Core 2020 may operate an orthogonal frequency division multiplexing (OFDM) communication protocol in accordance with an IEEE 802.11 family of standards, for example, IEEE 802.11-2007. Core 2030 may operate a frequency hopping spread spectrum communication protocol in accordance with a BLUETOOTH® family of standards (managed by the Bluetooth Special Interest Group), for example, Bluetooth Core version 2.0+EDR. Device 2010 is associated or in wireless communication with wireless access point or wireless station 2040 and also BLUETOOTH® device 2050.

BLUETOOTH® communications 2060 may consist of uplink and downlink packets, acknowledgements 2070, and periods of inactivity. While BLUETOOTH® communication session 2060 is ongoing; the access point 2040 sends to device 2010 a downlink packet 2080 with a first sequence number (e.g., 1) at a first rate. Despite the ongoing BLUETOOTH® communications 2060, the device 2010 acknowledges the packet 2080 using a lower power acknowledgement 2090. The lower power acknowledgement does not interfere significantly with the BLUETOOTH communications 2060 and prevents the access point or wireless station 2040 from retransmitting the packet 2080. Access point or wireless station 2040 may then send additional packets, such as data packet 2100. The device 2010 will send a low power acknowledgement packet 2110. Because the acknowledgement was sent by the device 2010, no rate reduction was made between packets 2080 and 2100.

The reduced power level with which the control packets are transmitted may be a power level that is less than the power level used to transmit non-control packets (e.g. data packets). The reduction in power may be a static reduction relative to the normal (non-control packet) power level, or may be determined by analyzing a received signal strength indication (RSSI) of the received downlink packet and determining a power level for the reply based upon the RSSI. Using an RSSI to set the power level ensures that the control packet is transmitted at the lowest possible setting which ensures reception of the control packet by the node that sent the data packet with the smallest chance of interference with other wireless protocols. For example, the following table may be used to determine the appropriate power for the control packets:

| RSSI | TX power |
| --- | --- |
| Between 0 and −70 | 0 dbm |
| Between −60 and −70 | 5 dbm |
| Between −70 and −100 | MAX (15 dmb) |

Notice that in some examples, if the RSSI is too low (between −70 and −100), then the control packet may not be sent at a reduced power (otherwise the packet will not be received by the destination wireless device). In these examples, the device may send the control packet at full power (and risk interfering with other communications on other wireless protocols), or may decide not to send the control packet at all.

In some examples, the control packets (e.g., the ack packets) are sent in a reduced power mode regardless of the communications states of the other protocols. This simplifies the design of the device because the device need not ascertain the communications states of the other protocols. In yet other examples, the control packets may be sent at a reduced power only when other protocols are currently communicating. To determine whether the other communications protocol is currently communicating, the device may utilize the TDM schedule to determine which protocol is scheduled (and authorized) to use the spectrum at a particular time. In other examples the device may sense when the other communication protocols are busy and when they are free based upon sensing the carrier. Note that in some examples, only one of the cores may utilize this reduced power control packet method in order to minimize interference with other cores, but in other examples, multiple cores may utilize this method.

Figure 3:
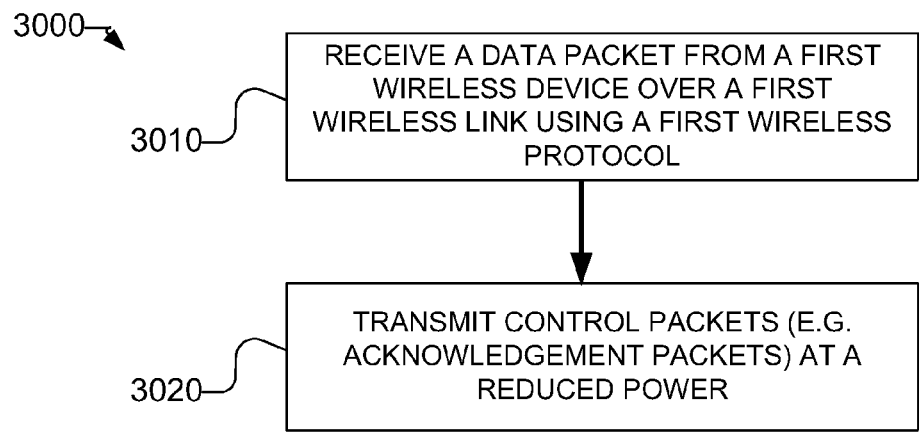
FIG. 3 shows a flowchart of an example method of sending a reduced power control packet according to some examples of the present disclosure.

FIG. 3 shows one method 3000 which may be utilized by the multiple protocol wireless devices for communicating using multiple wireless protocols according to some examples of the present disclosure. FIG. 3 utilizes the reduced power for all control packets regardless of which core is currently communicating. At operation 3010 a wireless communication device capable of communicating over multiple different wireless communication protocols receives a data packet from a first wireless device over a first wireless link using a first wireless communication protocol. At operation 3020, the wireless device transmits a control packet (e.g., an ack packet) to the wireless device using a reduced power regardless of the communications state of the other core and regardless of which core is currently active.

Figure 4:
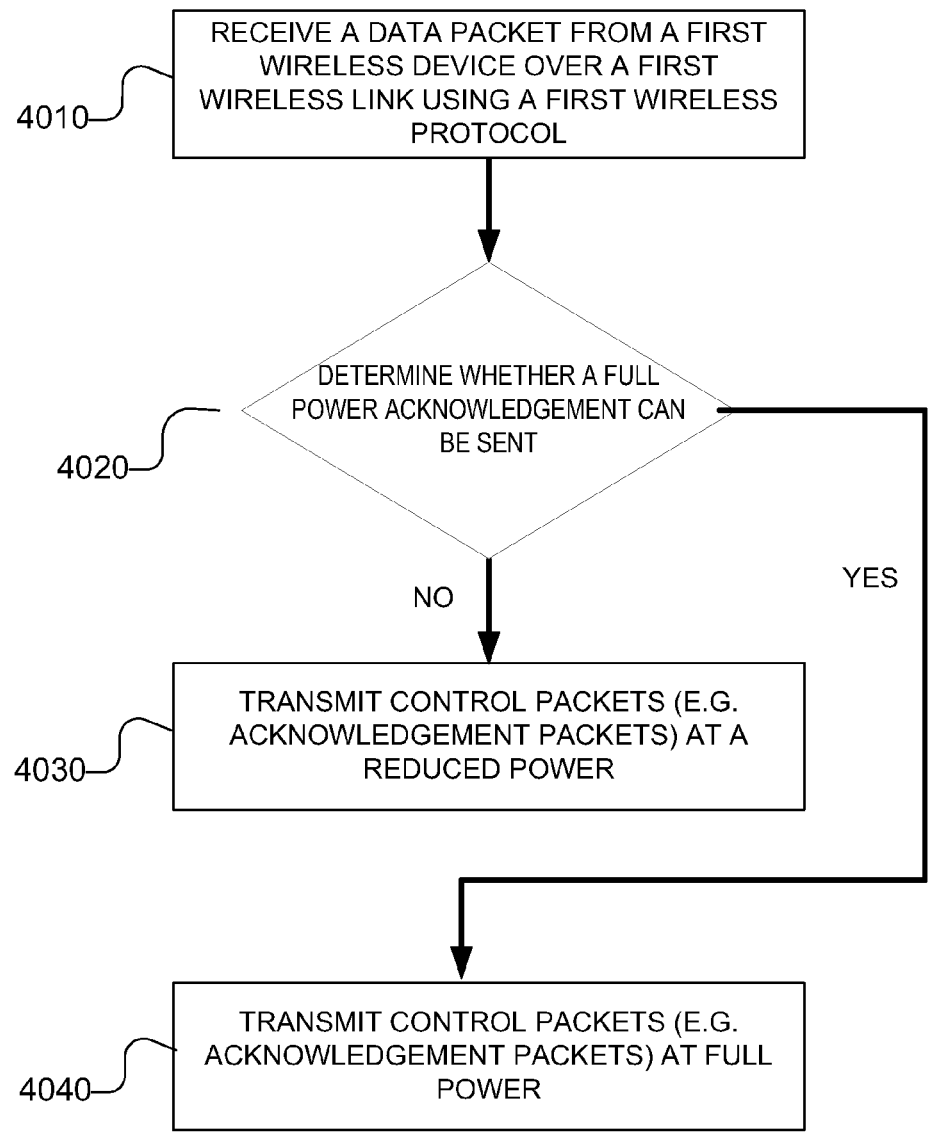
FIG. 4 shows a flowchart of an example method of sending a reduced power control packet according to some examples of the present disclosure.

FIG. 4 shows another method 4000 which may be utilized by the multiple protocol wireless devices for communicating using multiple wireless protocols according to some examples of the present disclosure. FIG. 4 utilizes the reduced power for control packets only where the other protocols are not actively communicating (e.g., such as when the protocol is not scheduled to communicate). At operation 4010 a wireless communication device capable of communicating over multiple different wireless communication protocols receives a data packet from a first wireless device over a first wireless communication link using a first wireless protocol. At operation 4020, the core determines whether a full power acknowledgement may be sent. This determination may be made by determining whether the core handling the first wireless protocol is currently scheduled according to a TDM schedule or TDM scheduler. In other examples, the determination may be based upon whether or not the other core(s) are currently transmitting (e.g., based upon detecting that the wireless medium is currently occupied). If the full power control packet cannot be sent, then the control packet is transmitted at a reduced power at operation 4030. If the full power control packet can be sent, then the control packet may be transmitted at full power at operation 4040.

While the above examples illustrate control packets in the form of acknowledgement packets, it will be appreciated by one skilled in the art with the benefit of Applicants' disclosure that the control packets may be any packet necessary to maintain a connection or state with a communicating peer device or entity. For example, a Request to Send (RTS) control packet may also be sent at reduced power. The RTS packet is sent by a node who wishes to send data. The destination node replies with a Clear To Send (CTS). Other nodes which receive either packet should refrain from sending data for a given time. In addition, while the above examples utilized 802.11 and BLUETOOTH® protocols, it will be appreciated by one skilled in the art with the benefit of Applicants' disclosure that the protocols may be any set of protocols which utilize similar frequency bands and which have the potential for interference.

Figure 5:
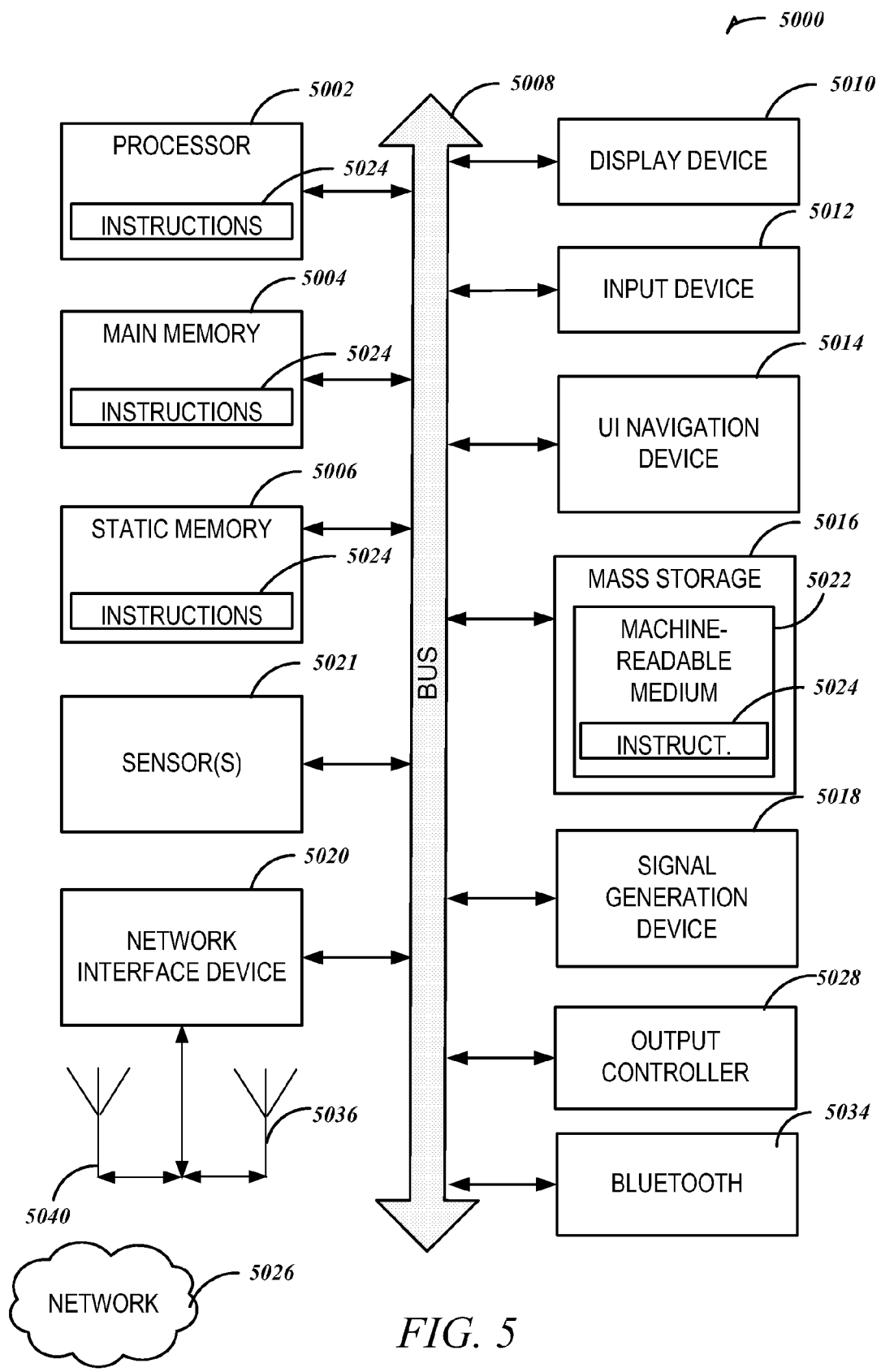
FIG. 5 shows a schematic of an example of a machine according to some examples of the present disclosure.

FIG. 5 illustrates a block diagram of an example machine 5000 upon which any one or more of the techniques (e.g., methodologies) discussed herein can be performed. In alternative embodiments, the machine 5000 can operate as a standalone device or can be connected (e.g., networked) to other machines. In a networked deployment, the machine 5000 can operate in the capacity of a server machine, a client machine, or both in server-client network environments. In an example, the machine 5000 can act as a peer machine in peer-to-peer (P2P) (or other distributed) network environment. The machine 5000 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 5000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time respective different modules at different times. Software can accordingly configure a hardware processor, for example, to constitute a particular module at one instance of time and to constitute a different module at a different instance of time.

Machine (e.g., computer system) 5000 can include a hardware processor 5002 (e.g., a central processing unit (CPU), a graphics processing unit (GPU), a hardware processor core, or any combination thereof), a main memory 5004 and a static memory 5006, some or all of which can communicate with each other via a bus 5008. The machine 5000 can further include a display unit 5010, an alphanumeric input device 5012 (e.g., a keyboard), and a user interface (UI) navigation device 5011 (e.g., a mouse). In an example, the display unit 5010, input device 5017 and UI navigation device 914 can be a touch screen display. The machine 5000 can additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 can include an output controller 5028, such as a serial (e.g., universal serial bus (USB), parallel, or other wired or wireless (e.g., infrared (IR)) connection to communicate or control one or more peripheral devices (e.g., a printer, card reader, etc.).

The storage device 5016 can include a machine-readable medium 5022 on which is stored one or more sets of data structures or instructions 5024 (e.g., software) embodying or utilized by any one or more of the techniques or functions described herein. The instructions 5024 can also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 can constitute machine readable media.

While the machine-readable medium 5022 is illustrated as a single medium, the term "machine readable medium" can include a single medium or multiple media (e.g., a centralized or distributed database, and/or associated caches and servers) that configured to store the one or more instructions 5024.

The term "machine-readable medium" can include any tangible medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 5024 can further be transmitted or received over a communications network 5026 using a transmission medium via the network interface device 5020. Network interface device 5020 may connect the machine 5000 to a network of other machines in order to communicate with the other machines in the network by utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 5020 can include one or more physical jacks (e.g., Ethernet, coaxial, or phone jacks) or one or more antennas to connect to the communications network 5026. In an example, and as shown in FIG. 5, the network interface device 5020 can include a plurality of antennas, for example, 5036 and 5040, to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 5000, and includes digital or analog communications signals or other intangible medium to facilitate communication of such software. Machine 5000 may also include Bluetooth controller 5034 which allows the machine to communicate with Bluetooth devices according to Bluetooth standards using frequency hopping spread spectrum communication protocols.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled The following are additional examples:

Disclosed in some examples is a method including receiving a downlink data packet over a first wireless link using a first wireless protocol during communications over a second wireless link using a second wireless protocol, the first and second wireless protocols being different; and sending a control packet in response to the downlink data packet over the first wireless link using a reduced power setting during the communications over the second wireless link, the reduced power setting being less than a non-control packet power setting.

Disclosed in other examples is a communication apparatus including a first communications module configured to communicate over a first wireless link using a first wireless protocol; a second communications module configured to communicate over a second wireless link using a second wireless protocol, the first and second wireless protocols being different; and wherein the first communications module is configured to send a control packet in response to a downlink data packet received over the first wireless link using a reduced power setting while the second communications module is communicating over the second wireless link, the reduced power setting being less than a non-control packet power setting.

Disclosed in yet other examples is a machine readable medium that stores instructions which when performed by a machine, cause the machine to perform certain operations. In some examples the operations include receiving a downlink data packet over a first wireless link using a first wireless protocol during communications over a second wireless link using a second wireless protocol, the first and second wireless protocols being different; and sending a control packet in response to the downlink data packet over the first wireless link using a reduced power setting during the communications over the second wireless link, the reduced power setting being less than a non-control packet power setting.

What is claimed is:

1. A method comprising:
  receiving a downlink data packet over a first wireless link using a first wireless protocol during communications over a second wireless link using a second wireless protocol, the first and second wireless protocols being different;
  responsive to receiving the downlink data packet during communications over the second wireless link using the second wireless protocol:
    calculating a reduced power level for acknowledgement of the downlink data packet such that the reduced power level is less than a normal power level used to transmit uplink data packets over the first wireless link; and
    sending an acknowledgement packet over the first wireless link using the reduced power level, the acknowledgement packet sent during the communications over the second wireless link; and
  receiving a second downlink data packet over the first wireless link and responsive to determining that no communications are ongoing over the second wireless link, sending a second acknowledgement over the first wireless link using the normal power level used to transmit uplink data packets over the first wireless link.

2. The method of claim 1, wherein the first wireless protocol is a wireless protocol according to an Institute of Electrical and Electronics Engineers (IEEE) 802.11 family of standards.

3. The method of claim 1, wherein the second wireless protocol is a wireless protocol according to a BLUETOOTH family of standards.

4. The method of claim 1, wherein the first and the second wireless protocols utilize overlapping frequency spectrums.

5. The method of claim 1, wherein determining that no communications are ongoing over the second wireless link comprises determining whether a first or second communication core which respectively handles the first and second communication protocols is currently active based on a time division scheme.

6. The method of claim 1, wherein the reduced power level is calculated based upon a received signal strength indication.

7. A communication apparatus comprising:
a first communications module configured to communicate over a first wireless link using a first wireless protocol;
a second communications module configured to communicate over a second wireless link using a second wireless protocol, the second protocol different than the first protocol; and
wherein the first communications module is configured to:
receive a downlink data packet over the first wireless link using the first wireless protocol during communications over the second wireless link using the second wireless protocol;
in response to receiving the downlink data packet during communications over the second wireless link using the second wireless protocol:
calculate a reduced power level for acknowledgement of the downlink data packet such that the reduced power level is less than a normal power level used to transmit uplink data packets over the first wireless link; and
send an acknowledgement packet in response to a downlink data packet received over the first wireless link using the reduced power level, the acknowledgement packet sent while the second communications module is communicating over the second wireless link; and
receive a second downlink data packet over the first wireless link and responsive to determining that no communications are ongoing over the second wireless link, send a second acknowledgement over the first wireless link using the normal power level used to transmit uplink data packets over the first wireless link.

8. The apparatus of claim 7, wherein the first wireless protocol is a wireless protocol according to an Institute of Electrical and Electronics Engineers (IEEE) 802.11 family of standards.

9. The apparatus of claim 7, wherein the second wireless protocol is a wireless protocol according to a BLUETOOTH family of standards.

10. The apparatus of claim 7, wherein the first and second wireless protocols utilize overlapping frequency spectrums.

11. The apparatus of claim 7, wherein determining that no communications are ongoing over the second wireless link comprises determining whether the first or second communication modules is currently active based on a time division scheme.

12. The apparatus of claim 7, wherein the first communications module is configured to calculate the reduced power level based upon a received signal strength indication.

13. A machine readable medium that stores instructions which when performed by a machine, cause the machine to perform operations comprising:
receiving a downlink data packet over a first wireless link using a first wireless protocol during communications over a second wireless link using a second wireless protocol, the first and second wireless protocols being different;
responsive to receiving the downlink data packet during communications over the second wireless link using the second wireless protocol:
calculating a reduced power level for acknowledgment of the downlink data packet such that the reduced power level is less than a normal power level used to transmit uplink data packets over the first wireless link; and
sending an acknowledgement packet in response to the downlink data packet over the first wireless link using the reduced power level, the acknowledgement packet sent during the communications over the second wireless link; and
receiving a second downlink data packet over the first wireless link and responsive to determining that no communications are ongoing over the second wireless link, sending a second acknowledgement over the first wireless link using the normal power level used to transmit uplink data packets over the first wireless link.

14. The machine-readable medium of claim 13, wherein the first wireless protocol is a wireless protocol according to an Institute of Electrical and Electronics Engineers (IEEE) 802.11 family of standards.

15. The machine-readable medium of claim 13, wherein the second wireless protocol is a wireless protocol according to a BLUETOOTH family of standards.

16. The machine-readable medium of claim 13, wherein the first and second wireless protocols utilize overlapping frequency spectrums.

17. The machine-readable medium of claim 13, wherein the instructions for determining that no communications are ongoing over the second wireless link includes instructions, which when performed by the machine, cause the machine to determine whether a first or second communication core which respectively handles the first and second communication protocols is currently active based on a time division scheme.

18. The machine-readable medium of claim 13, wherein the instructions for calculate the reduced power level includes instructions, which when performed by the machine, causes the machine to calculate the reduced power level based upon a received signal strength indication.

* * * * *

UNITED STATES PATENT AND TRADEMARK OFFICE
CERTIFICATE OF CORRECTION

PATENT NO. : 9,055,533 B2  
APPLICATION NO. : 13/328051  
DATED : June 9, 2015  
INVENTOR(S) : Raskin et al.

Page 1 of 1

It is certified that error appears in the above-identified patent and that said Letters Patent is hereby corrected as shown below:

Title page, item (54), and in the Specification, in column 1, line 4, in "Title", delete "USINGREDUCED" and insert --USING REDUCED--, therefor Signed and Sealed this
Twenty-first Day of June, 2016

Michelle K. Lee
*Director of the United States Patent and Trademark Office*